(12) United States Patent
Doe

(10) Patent No.: US 7,821,597 B2
(45) Date of Patent: Oct. 26, 2010

(54) DISPLAY DEVICE HAVING LIQUID CRYSTAL LAYER AND SWITCHABLE OPTICAL LAYER

(76) Inventor: Steve Doe, 8 Mainstone Close, Deepcut, Camberley, Surrey, GU 16 6RU (GB)

( * ) Notice: Subject to any disclaimer, the term of this patent is extended or adjusted under 35 U.S.C. 154(b) by 0 days.

(21) Appl. No.: 12/143,393

(22) Filed: Jun. 20, 2008

(65) Prior Publication Data

US 2008/0252813 A1 Oct. 16, 2008

Related U.S. Application Data

(62) Division of application No. 10/606,131, filed on Jun. 24, 2003, now Pat. No. 7,436,470.

(60) Provisional application No. 60/402,837, filed on Aug. 12, 2002.

(30) Foreign Application Priority Data

Jul. 6, 2002 (GB) .................................... 0215701

(51) Int. Cl.
*G02F 1/1335* (2006.01)
*G09G 3/10* (2006.01)

(52) U.S. Cl. .......................... 349/69; 349/61; 315/169.3
(58) Field of Classification Search .................. 349/69; 315/169.3

See application file for complete search history.

(56) References Cited

U.S. PATENT DOCUMENTS 4,477,805 A * 10/1984 Arton et al. .................. 345/94
4,500,173 A 2/1985 Leibowitz et al.
4,958,911 A 9/1990 Beiswenger et al.
5,452,113 A 9/1995 Ikeno
5,506,706 A 4/1996 Yamahara et al.
5,508,831 A 4/1996 Nakamura et al.
5,686,979 A 11/1997 Weber et al.
6,046,547 A * 4/2000 Nishio et al. ............. 315/169.3
6,356,323 B1 3/2002 Petruchik
6,437,900 B1 8/2002 Cornelissen et al.
6,462,805 B1 10/2002 Wu et al.
6,697,138 B2 * 2/2004 Ha et al. ..................... 349/114
6,714,268 B2 * 3/2004 Wang et al. ................... 349/48
6,778,238 B2 8/2004 Moon et al.
6,842,209 B2 1/2005 Sumiyoshi et al.
2002/0196387 A1 * 12/2002 Kimura ....................... 349/61

FOREIGN PATENT DOCUMENTS

| GB | 2314 665 A | 10/1997 |
| JP | 2002023156 A | 1/2002 |
| WO | WO 99/66483 | 12/1999 |
| WO | WO 02/06891 A1 | 1/2002 |

OTHER PUBLICATIONS

Great Britain Search Report for GB 0215701.4, dated Dec. 9, 2002.

* cited by examiner

*Primary Examiner*—Michael H Caley

(57) ABSTRACT

A display device including a first electrode, a liquid crystal layer positioned under and connected to the first electrode, a second electrode and a switchable optical layer. The switchable optical layer includes either a transparent state or a non-transparent state and is electrically switchable between the transparent state and the non-transparent state. The non-transparent state is selectively emissive state. The switchable optical layer is positioned above and connected to the second electrode. A third electrode is positioned between the liquid crystal layer and the switchable optical layer.

15 Claims, 2 Drawing Sheets

-- PRIOR ART --

-- PRIOR ART -- us# DISPLAY DEVICE HAVING LIQUID CRYSTAL LAYER AND SWITCHABLE OPTICAL LAYER

CROSS-REFERENCE TO RELATED APPLICATIONS

This application is a divisional of U.S. patent application Ser. No. 10/606,131 that was filed Jun. 24, 2003, the disclosure of which is incorporated by reference in its entirety. U.S. patent application Ser. No. 10/606,131 claims the benefit of U.S. Provisional Patent Application Ser. No. 60/402,837, that was filed Aug. 12, 2002, the disclosure of which is incorporated by reference in its entirety. U.S. patent application Ser. No. 10/606,131 also claims priority under the Paris Convention to Great Britain application 0215701, filed Jul. 6, 2002, the disclosure of which is incorporated by reference in its entirety.

FIELD

The present invention relates to carrying out transmit antenna diversity from a base station to mobile stations and, more particularly, to doing so in a system with both mobile stations equipped to handle antenna diversity and mobile stations not so equipped.

BACKGROUND

FIG. 1 illustrates an existing transmissive liquid crystal display (LCD) device 10. The transmissive LCD device 10 comprises a front polariser 12, a transparent mechanical substrate 14, a transparent unitary electrode 16, a nematic liquid crystal layer 18, a transparent pixellated electrode 20 comprising a plurality of distinct electrodes each of which has an associated pixel switch 24, a transparent mechanical substrate 22, a rear polariser 26 and a back light 28.

The front polariser 12 and the rear polariser 26 are arranged as cross-polarisers. The mechanical substrate 14 supports the transparent unitary electrode 16 and provides mechanical rigidity to the device. It is typically made of glass and supports the front polariser 12 on its upper surface and the transparent unitary electrode 16 on its lower surface. The mechanical substrate 22 has the plurality of pixel switches 24 defined on its upper surface. Each of the pixel switches is electrically connected to one of the plurality of electrodes of the transparent pixellated electrode 20. The lower surface of the mechanical substrate 22 supports the rear polariser 26. The nematic liquid crystal layer 18 is positioned between the transparent unitary electrode 16 and the transparent pixellated electrode 20. When a pixel switch is on, a voltage is applied across the overlying portion of the liquid crystal layer 18. The back light is positioned beneath the rear polariser 26. Light from the back light 28 is initially polarised to a particular orientation by the rear polariser 26. As this light travels through the nematic liquid crystal layer 18 its polarisation will be changed again to either a first orientation or a second orientation depending upon whether the portion of the liquid crystal through which it is travelling has a voltage across it. The front polariser 12 will only let light pass through having polarisation of the first orientation. Therefore, the transmissive liquid crystal device 10 is selectively transmissive in dependence upon the state of the pixel switches 24. This type of device has good image quality in low and at normal ambient light conditions but it is very difficult to see in bright conditions. In addition, the device requires a permanent back light which uses too much power for many modern applications.

FIG. 2 illustrates an existing reflective liquid crystal display device 30. The reflective LCD device 30 comprises a front light 38, a front polariser 12, a mechanical substrate 14, a transparent unitary electrode 16, a nematic liquid crystal layer 18, a pixellated reflective electrode 32 comprising a plurality of distinct reflective electrodes each of which has an associated pixel switch 34 and a mechanical substrate 36.

The differences between the reflective LCD device 30 and the transmissive LCD device 10 are that the reflective device 30 has a front light 38 positioned above the front polariser 12 and does not have a back light; the pixellated electrode 32 between the lower mechanical substrate 36 and the liquid crystal layer 18 is reflective and is not transparent; and the absence of a rear polariser in the reflective LCD device 30.

Light from the front light 38 passes through the front polariser 12 so that it is polarised in a first orientation, when the light is reflected by a pixellated electrode its polarisation is changed. The polarisation of the light is further changed by passing through the liquid crystal layer 18 and the extent of this change is dependent upon the voltage applied across the portion of the liquid crystal layer through which the light travels, which is in turn dependent upon whether the pixel switch associated with that portion of the liquid crystal layer 18 is on or off. Depending upon the extent to which the liquid crystal layer changes the polarisation of the reflected light, the front polariser 12 either will or will not pass the light. Thus the pixel switches 34 can be used to make portions of the display either reflective or absorptive. A problem with this type of device is that the image quality of the display is reduced by the presence of a front light 38.

Transflective liquid crystal display devices address this problem by removing the front light 38 and introducing a back light. Each of the distinct electrodes making up the pixellated reflective electrode layer 32 is adapted to have a small hole in it which lets light through from the back light. However, transflective liquid crystal display devices are a poor compromise between transmissive and reflective liquid crystal displays. If the display is optimised towards being bright in daylight by making the holes in the reflector smaller, then it will be darker with the back light on or will need more power in the back light to get the same brightness.

It would be desirable to provide a display device which has good image quality irrespective of the ambient light conditions and does not have excessive power requirements.

SUMMARY

According to one aspect of the present invention there is provided a display device comprising: a first electrode; a liquid crystal layer positioned under and connected to the first electrode; a second electrode; a switchable optical layer, having a transparent state and a non-transparent state and being electrically switchable between the transparent state and the non-transparent state, positioned above and connected to the second electrode; and a third electrode positioned between the liquid crystal layer and the switchable optical layer.

In one embodiment the non-transparent state of the switchable optical layer is a reflective state. In another embodiment the non-transparent state of the switchable optical layer is a light emissive state.

According to another aspect of the present invention there is provided a method of controlling a display device comprising a liquid crystal layer and an underlying transparent/reflective layer which is either uniformly transparent or uniformly reflective, to operate in a first mode by: selectively controlling portions of the liquid crystal layer and uniformly maintaining the transparent/reflective layer in a transparent state, and to operate in a second mode by: selectively controlling portions of the liquid crystal layer and uniformly maintaining the transparent/reflective layer in a reflective state.

According to a further aspect of the present invention there is provided a method of controlling a display device comprising a liquid crystal layer and an underlying transparent/emissive layer which is selectively either transparent or emissive, to operate in a transmissive mode by: selectively controlling portions of the liquid crystal layer and uniformly maintaining the transparent/emissive layer in a transparent state, and to operate in an emissive mode by: uniformly controlling the liquid crystal layer and selectively enabling portions of the transparent/emissive layer so that the selected portions emit light.

BRIEF DESCRIPTION OF THE DRAWINGS

For a better understanding of the present invention and to understand how the same may be brought into effect reference will now be made by way example only to the following drawings, in which.

DETAILED DESCRIPTION

Figure 3:
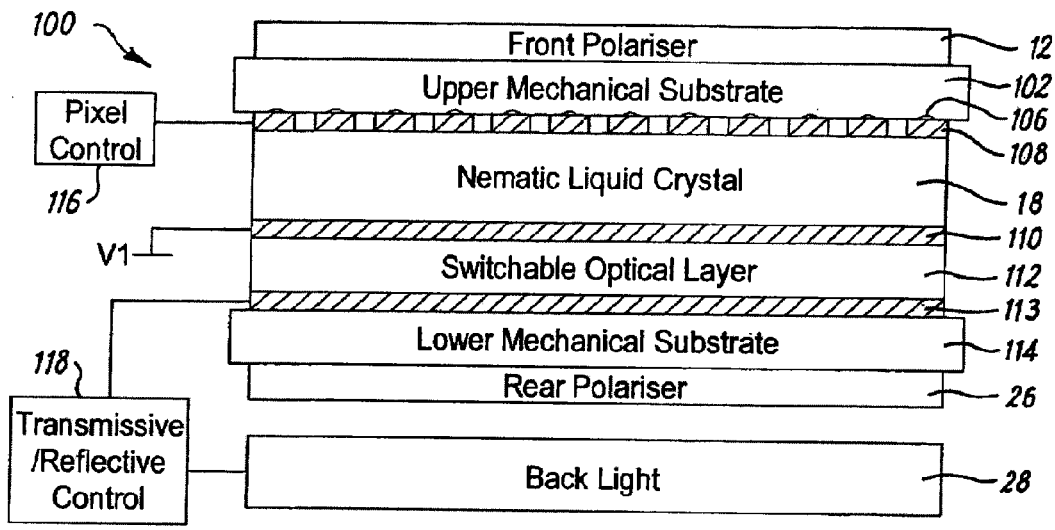
FIG. 3 illustrates a first embodiment of the present invention.

FIG. 3 illustrates a display device 100 which can operate as either a transmissive liquid crystal display device or as a reflective liquid crystal display device. The display device 100 comprises a front polariser 12 supported on an upper surface of an upper mechanical substrate 102, a plurality of pixel switches 106 defined on a lower surface of the upper mechanical substrate 102, a pixellated electrode 108 comprising a plurality of distinct electrodes each of which is associated with a pixel switch 106, lies between the upper mechanical substrate 106 and a nematic liquid crystal layer 18, a first unitary transparent electrode 110 underlies the liquid crystal layer 18, a switchable optical layer 112 underlies the first unitary transparent electrode 110, a second unitary transparent electrode 113 underlies the switchable optical layer 112 and is supported on an upper surface of a transparent lower mechanical substrate 114, and a rear polariser 26 is supported on the lower surface of the lower mechanical substrate 114. A back light 28 is positioned underneath the rear polariser 26. The front polariser 12 and the rear polariser 26 are arranged as cross-polarisers. The upper mechanical substrate is transparent and is preferably made of glass. Each of the pixel switches 106 is either a transistor, for example formed from a amorphous silicon or a diode. The pixellated transparent electrode 108 is formed from a layer of indium tin oxide (ITO) and each of the plurality of separate electrodes which forms the pixellated transparent electrode 108 is typically a square of about 0.2 mm in length.

The nematic liquid crystal layer 18 is a standard nematic liquid crystal layer and its polarisation properties are dependent upon the voltage applied across it. The first unitary transparent electrode 110 is formed from a single layer of indium tin oxide. The switchable optical layer 112 is typically tens of micrometers thick. It is preferably formed from a polymer dispersed liquid crystal (PDLC) but it can also be formed from cholesteric liquid crystals. The important property of the switchable optical layer 112 is that it can be switched from being in a substantially transparent state to being in a substantially reflective state. The second unitary transparent electrode 113 is formed from a single layer of indium tin oxide. The lower mechanical substrate is transparent and is preferably formed from glass.

Figure 1:
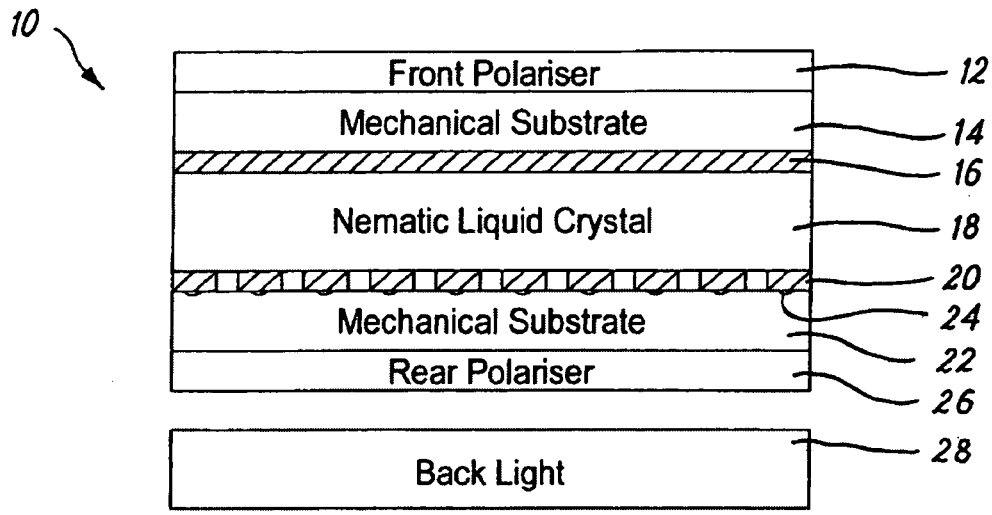
FIG. 1 illustrates a prior art transmissive liquid crystal display device.

The display device 100 also comprises a pixel controller 116 which is connected to selectively enable the pixel switches 106 and a transmissive/reflective controller 118 which is connected to the second unitary transparent electrode 112 and the back light 28. The first unitary transparent electrode is connected to a constant first voltage V1. When the display device 100 is operating as a transmissive display, the transmissive/reflective controller 118 supplies a voltage V1 to the second unitary transparent electrode 113 and switches on the back light 28. The first unitary transparent electrode 110 and the second unitary transparent electrode 113 are at the same voltage and no voltage is developed across the switchable optical layer 112. Consequently, the switchable optical layer 112 is in its transparent state. (In alternative embodiments, the optical layer may be reflective with no voltage across it and transparent with a voltage across it). The pixel controller 116 selectively switches on a first plurality of pixel switches 106 and switches off a second plurality of pixel switches thereby defines on the upper surface of the display device an image. In this mode of operation, the display device 100 operates in a similar manner to the transmissive device 10 described in relation to FIG. 1. There are however significant structural differences. In particular, the pixellated electrode 108 and pixel switches 106 are positioned above the liquid crystal layer 18 and the unitary electrode is positioned beneath the liquid crystal layer 18. In addition the unitary electrode is replaced by a sandwich structure comprising a first unitary transparent electrode 110, a switchable optical layer 112 and a second unitary transparent electrode 113.

When the display device 100 is operating as a reflective display device, the transmissive/reflective controller 118 provides a voltage V2 to the second unitary transparent electrode 113 and does not switch on the back light 28. The first unitary electrode 110 and the second unitary electrode 113 are at different voltages and a potential is developed across the switchable optical layer 112. Consequently, the switchable optical layer 112 becomes reflective (In alternative embodiments, the optical layer may be reflective with no voltage across it and transparent with a voltage across it). The pixel controller 116 is used to define the image produced by the display device 100. In this reflective mode of operation, the display device 100 operates in a similar manner to the reflective LCD device 30 described in relation to FIG. 2. There are, however, some major structural differences. In this embodiment, the pixellated electrode 108 and the pixel switches 106 replace the unitary transparent electrode above the liquid crystal layer 18 and must therefore be transparent. In addition, a sandwich structure comprising the first unitary transparent electrode 110, the switchable optical layer 112 and the second unitary transparent electrode 113, now lies beneath the liquid crystal layer 18.

In the reflective mode, the display device 100 acts like a reflective LCD and has the image quality of a normal reflective LCD. In the transparent mode, the display device 100 acts like a transmissive LCD and has the same image quality as a normal transmissive LCD. This embodiment therefore represents an optimum combination of reflective and transmissive liquid crystal displays.

Figure 4:
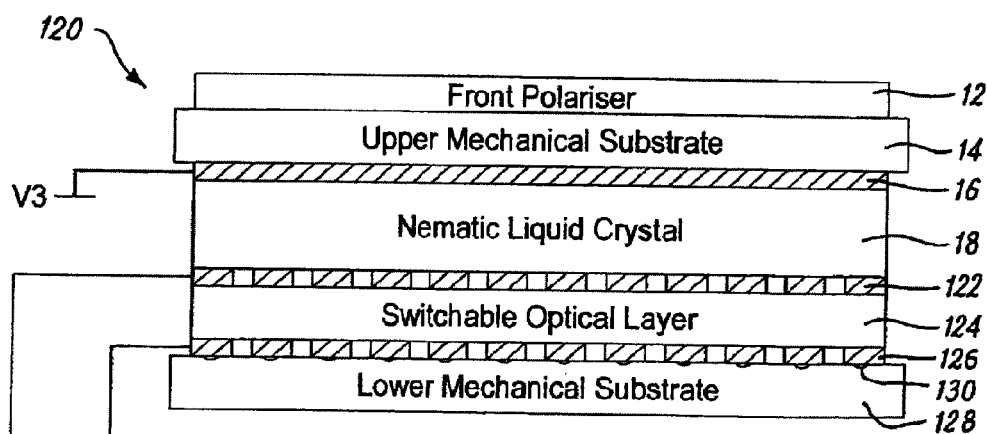
FIG. 4 illustrates a second embodiment of the present invention.

FIG. 4 illustrates a display device 120 according to a second embodiment of the present invention. The display device 120 can operate as a reflective liquid crystal display device or as a light emissive device. The display device 120 comprises a front polariser 12 supported by the upper surface of a upper mechanical substrate 14, a unitary transparent electrode 16 supported by the lower surface of the upper mechanical substrate 14, a nematic liquid crystal layer 18 underlying the unitary transparent electrode 16, a first pixellated transparent electrode 122 underlying the liquid crystal layer 18, a switchable optical layer 124 underlying the first pixellated transparent electrode 122, a second pixellated transparent electrode 126 underlying the switchable optical layer 124 and overlying a upper surface of a lower mechanical substrate 128 on which has been defined a plurality of pixel switches 130.

The first pixellated transparent electrode 122 comprises a plurality of distinct electrodes. The second pixellated transparent electrode 126 also comprises a plurality of distinct electrodes. Each one of the distinct electrodes of the first pixellated transparent electrode 122 overlies and opposes, with the switchable optical layer 124 intervening, an associated one of the distinct electrodes of the second pixellated transparent electrode 126. Each one of the distinct electrodes of the second pixellated transparent electrode 126 is associated with a pixel switch 130.

The upper mechanical substrate 14 is transparent and preferably made of glass. The unitary transparent electrode 16 is preferably made from indium tin oxide (ITO) deposited on the lower surface of the upper mechanical substrate 14. The first pixellated transparent electrode 122 is formed from a layer of indium tin oxide. The switchable optical layer 124 has the physical property that it can be switched from being substantially transparent to being light emissive. The switchable optical layer 124 is preferably formed from organic light emitting diodes (OLED)—light emitting dendrimers and inorganic electroluminescent layers could also be used. The second pixellated reflective electrode 126 is formed from a layer of metal deposited on the lower mechanical substrate 128.

The unitary transparent electrode 16 is connected to a constant voltage supply V3. A pixel reflective/emissive controller 132 controls whether or not the display device 120 is operating as a reflective liquid crystal display device or as a light emissive device. When the display device 120 is operating as a reflective liquid crystal display device, each distinct electrode of the first pixellated transparent electrode 122 is electrically connected in parallel with its associated distinct electrode of the second pixellated reflective electrode 126. Thus, if a pixel switch 130 is switched on at a particular pixel, the distinct electrode of the second pixellated reflective electrode 126 overlying the pixel switch 130 will be brought to a first voltage and the overlying associated distinct electrode of the first pixellated transparent electrode 122 will be brought to the same first voltage. Consequently, no voltage will be developed across any part of the switchable optical layer 124. The whole of the switchable optical layer 124 would therefore be transparent. However, a voltage will be selectively developed across portions of the liquid crystal layer 18 as the pixel switches 130 are switched on or off.

Figure 2:
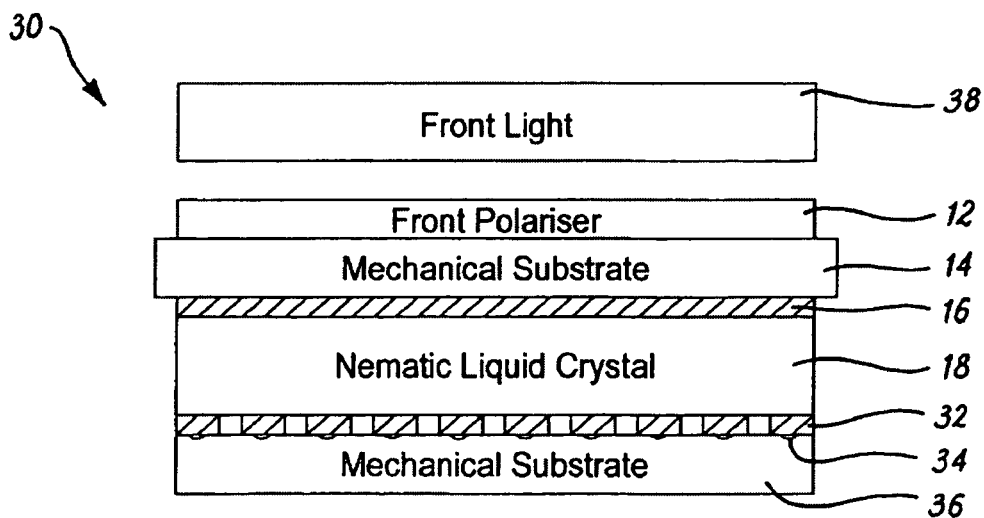
FIG. 2 illustrates a prior art reflective liquid crystal display device.

The display device 120 therefore operates in a manner similar to the reflective LCD device described in relation to FIG. 2. However, there are a number of significant differences. The display device 120 does not have a front light, and a pixellated transparent electrode 122 and switchable optical layer 124 lie in between the liquid crystal layer 18 and the pixellated reflective electrode 126.

When the display device 120 is operating as a light emissive device, all of the distinct electrodes making up the first pixellated transparent electrode 122 are electrically connected together and connected to the constant voltage V3. The first pixellated transparent electrode 122 in this electrical configuration operates as a unitary electrode and no voltage is developed across the liquid crystal layer 18. The pixel switches 130 supply the voltage or current necessary to enable the overlying portions of the switchable optical layer to emit light. Consequently, by the selective enablement of the pixel switches 130, selective portions of the switchable optical layer 124 will emit light to produce an image on the display device 120.

Figure 5:
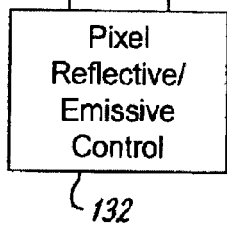
FIG. 5 illustrates a mobile device having a display according to the present invention.

FIG. 5 illustrates a mobile device 200 comprising a display device 100 or 120. The mobile device 200 may be a hand-portable communications device such as a mobile phone or a personal digital assistant.

Although the present invention has been described in the preceding paragraphs with reference to various examples, it should be appreciated that modifications and variations to the examples given can be made without departing from the scope of the invention as claimed.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

What is claimed is:

1. A display device comprising:
 a first electrode;
 a liquid crystal layer positioned under and connected to the first electrode;
 a second electrode;
 a switchable optical layer, having in use either a transparent state or a non-transparent state and being electrically switchable between the transparent state and the non-transparent state, wherein the non-transparent state is a selectively emissive state, and wherein the switchable optical layer is positioned above and connected to the second electrode;
 a plurality of pixel switches in physical contact with and electrically connected to the second electrode; and
 a third electrode positioned between the liquid crystal layer and the switchable optical layer,
 wherein the second electrode is a first pixellated electrode connected to the switchable optical layer and comprises a first plurality of first distinct electrodes, wherein the third electrode is a second pixellated electrode connected to the switchable optical layer and comprises a plurality of second distinct electrodes, and wherein each one of the first distinct electrodes opposes an associated second distinct electrode across the switchable optical layer, and further wherein the plurality of pixel switches are positioned below the second electrode, such that each pixel switch is connected to one of the plurality of first distinct electrodes;
 wherein the first electrode is electrically connected to a constant voltage supply; and
 wherein the third electrode is electrically connected to the constant voltage supply during the non-transparent state.

2. The display device of claim 1, wherein the third electrode is shared by the liquid crystal layer and the switchable optical layer.

3. The display device of claim 1, wherein at least one of the first or third electrodes is pixellated and has associated pixel switches.

4. The display device of claim 1, wherein the first electrode is a unitary transparent electrode.

5. The display device of claim 1, wherein the third electrode is transparent.

6. The display device of claim 1, wherein the second electrode is reflective.

7. The display device of claim 1, further comprising control means configured, in a first mode, to maintain the second distinct electrodes of the third electrode at the same voltage and, in a second mode, to maintain each second distinct electrode of the third electrode at the same voltage as its associated first distinct electrode of the second electrode.

8. The display device of claim 1, wherein at least a portion of the plurality of pixel switches are configured to supply a voltage or current to the second electrode to enable the switchable optical layer to emit light.

9. The display device of claim 1, wherein the second and third electrodes are configured to be electrically connected in parallel during the transparent state.

10. A mobile device comprising:
a power supply; and
a display device including:
a first electrode;
a liquid crystal layer positioned under and connected to the first electrode;
a second electrode;
a switchable optical layer, having in use either a transparent state or a non-transparent state and being electrically switchable between the transparent state and the non-transparent state, wherein the non-transparent state is a selectively emissive state, and wherein the switchable optical layer is positioned above and connected to the second electrode;
a plurality of pixel switches in physical contact with and electrically connected to the second electrode; and
a third electrode positioned between the liquid crystal layer and the switchable optical layer,
wherein the second electrode is a first pixellated electrode connected to the switchable optical layer and comprises a first plurality of first distinct electrodes, wherein the third electrode is a second pixellated electrode connected to the switchable optical layer and comprises a plurality of second distinct electrodes, and wherein each one of the first distinct electrodes opposes an associated second distinct electrode across the switchable optical layer, and further wherein the plurality of pixel switches are positioned below the second electrode, such that each pixel switch is connected to one of the plurality of first distinct electrodes;
wherein the first electrode is electrically connected to a constant voltage supply; and
wherein the third electrode is electrically connected to the constant voltage supply during the non-transparent state.

11. The mobile device of claim 10, wherein the third electrode is shared by the liquid crystal layer and the switchable optical layer.

12. The mobile device of claim 10, wherein at least one of the first or third electrodes is pixellated and has associated pixel switches.

13. The mobile device of claim 10, wherein the first electrode is a unitary transparent electrode.

14. The mobile device of claim 10, wherein at least a portion of the plurality of pixel switches are configured to supply a voltage or current to the second electrode to enable the switchable optical layer to emit light.

15. The mobile device of claim 10, wherein the second and third electrodes are configured to be electrically connected in parallel during the transparent state.

* * * * *